US007130661B2

(12) United States Patent
Lee

(10) Patent No.: US 7,130,661 B2
(45) Date of Patent: Oct. 31, 2006

(54) APPARATUS FOR FORMING BEAM IN A BASE STATION OF A MOBILE COMMUNICATION SYSTEM

(75) Inventor: Jun-Sung Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 734 days.

(21) Appl. No.: 09/977,782

(22) Filed: Oct. 15, 2001

(65) Prior Publication Data

US 2002/0058535 A1 May 16, 2002

(30) Foreign Application Priority Data

Nov. 13, 2000 (KR) .............................. 2000-67188

(51) Int. Cl.
*H04M 1/00* (2006.01)

(52) U.S. Cl. .................... 455/562.1; 455/450; 455/82; 455/24; 455/25

(58) Field of Classification Search ................ 455/561, 455/562.1, 575.7, 121, 129, 24, 25, 82, 450, 455/455, 19, 515, 516, 509, 575; 342/372, 342/373

See application file for complete search history.

(56) References Cited

U.S. PATENT DOCUMENTS 5,603,089 A * 2/1997 Searle et al. ................ 455/507
6,286,994 B1 * 9/2001 Boesel et al. ............... 374/146
6,640,111 B1 * 10/2003 Shapira .................. 455/562.1
6,665,279 B1 * 12/2003 Kwak et al. ................ 370/328

* cited by examiner

*Primary Examiner*—Jefferey F. Harold
(74) *Attorney, Agent, or Firm*—Dilworth & Barrese LLP

(57) ABSTRACT

An apparatus for forming a beam in a base station is provided and includes a plurality of channel cards for processing and outputting signals to be transmitted to each channel; a signal synthesizer/distributor for synthesizing the signals from the channel cards and compensating phases of the signals; a channel controller for controlling beams of the signals from the signal synthesizer/distributor according to a demand of a mobile communication terminal and outputting the controlled beam signals; a middle frequency generating block for receiving the signals from the channel controller and synthesizing the signals in each frequency to generate middle frequency signals; a transmitter for converting the middle frequency signals received from the middle frequency generating block into signals in a transmitting band; an RFB for amplifying the signals from the transmitter into signals in an output band and controlling phases of transmitting and receiving signals; and an antenna connection block for switching the signals to corresponding antennas of the RFB so that beams can be generated.

2 Claims, 5 Drawing Sheets

APPARATUS FOR FORMING BEAM IN A BASE STATION OF A MOBILE COMMUNICATION SYSTEM

PRIORITY

This application claims priority to an application entitled "APPARATUS FOR FORMING BEAM IN BASE STATION OF MOBILE COMMUNICATION SYSTEM" filed with the Korean Industrial Property Office on Nov. 13, 2000 and assigned Serial No. 2000-67188, the contents of which is hereby incorporated by reference.

BACKGROUND OF THE INVENTION

1. Field of the Invention

The present invention relates to a base station apparatus in a mobile communication system, and more particularly, to a base station apparatus for increasing the efficiency of the base station to enlarge capacity and service quality of the system.

2. Description of the Related Art

In general, the base station of the mobile communication system includes a radio environment, in which each one of the base stations is composed of one cell. Also, each of the base stations is comprised of different radio environments, according to the construction and shape of the base station, which allows them to accept radio subscribers. There are many different types of base stations such as a sectored base station and an omni-type base station. The sectored base station has three sectored areas partitioned into 120 areas about the base station at the center of a circle. Each area includes equipment such as antennas, etc. Also, the sectored-type base station is classified into stations using 3FA and 1FA, where FA is a Frequency Assignment. Meanwhile, the omni-type base station is constructed to have the whole area in one radius without dividing sectors.

The base station is installed according to the number of mobile communication system users, and hardware for the base station is constructed of one basic frame, which can be extended when the extension of capacity is necessary. Therefore, the base station can be constructed of a basic frame and an extended frame, in which the basic frame and the extended frame have differences as follows:

The basic frame is comprised of a CCB (Common Control Block) for performing an overall control of the base station, a CPB (Channel Processing Block) for performing a channel process and an RFB (Radio Frequency Block). The extended frame comprises additional parts. In other words, the foregoing blocks are installed only in the basic frame, which perform functions including antenna diagnosis, base station control via a PSTN (Public Switched Telephone Network), self-diagnosis and self-test by the base station without assistance of a base station control block, etc. Also, the CPB is extended based on a shelf system, according to the capacity of the base station, and classified into two CPBs: one for accepting 32 channels and the other for 16 channels. The 32 and 16 channel cards can be freely installed and operated within the same shelf, and allows an optimum channel to be constructed, according to the capacity of the base station. Also, one shelf of the CPB can support an omni-6 CDMA (Code Division Multiple Access) carrier, a 3 sector 2 CDMA carriers and a 6 sector 1 CDMA carrier.

Also, the RFB performs signal transmitting/receiving amplification and a front-end function, and has various options which allows the RFB to select and install a front-end module most suitable to the construction of the base station.

In general, the base station includes a duplexer, and needs only two antennas per sector, including a transmission route, and a receiving diversity route. The RPB has a basic configuration, which includes a power amplifier, and can alternatively have a LPA (Low Power Amplifier) or an optic transceiver as optional features without using the power amplifier.

The base station having a cell construction of a 3 sector or 6 sector shape provides more enhanced capacity via sectored gain than using an omni-antenna. In this construction, however, the base station fails to provide an effective interference cancellation. Therefore, the enhanced capacity of the base station cannot be provided as much as a communication provider desires. The base station requires high electric power and thus there is a problem because a high quality service cannot be provided to a subscriber when other subscribers are also transmitting and receiving signals from the base station.

Also, the base station should have different hardware and software, according to the frequency allocated to the communication provider, service type, etc. Accordingly, development cost is increased and resource waste is incurred. While the communication providers are requesting compact sized outdoor base stations with middle capacity, some technical problems have not been solved such as cooling heat generated from the base station, reducing hardware volume, etc. In addition, if a shading area takes place during a service by the communication provider, this problem can be solved by applying relays. Presently, there are no methods available that address the aforementioned problems, which allows a system to solve this problem by itself. In other words, even if one base station frequently shows variation in popularity of the users, change cannot be always carried out, according to channel environment, and thus a problem occurs when the capacity of one base station should be increased. In other words, even if the users are counted within the range that can be accepted by one base station, the ability of each subscriber to use a base station cannot be solved when many users are crowded in one specific sector, and accordingly a problem occurs where the channels of the base station should be increased. Also, there have been problems where the construction of the RPB becomes huge when the output is decreased due to increase of power loss and cost is increased as the system capacity increases.

Therefore, there exists a need for an apparatus and a method that allows a base station to handle an increase amount of traffic from users.

SUMMARY OF THE INVENTION

It is therefore an object of the present invention to provide a base station apparatus, which allows a base station to be easily enlarged, and reduces power loss.

It is another object of the invention to provide a base station apparatus, which can eliminate a shading area in the maximum amount while satisfying features required by a mobile communication system.

It is a further object of the invention to provide a small sized base station apparatus in which a heat related problem is solved.

According to an embodiment of the invention to obtain the foregoing objects, an apparatus for forming a beam in a base station is provided, the apparatus comprising: a plurality of channel cards for processing and outputting signals to be transmitted to each channel; a signal synthesizer/distributor for synthesizing the signals from the channel cards and compensating phases of the signals; a channel controller for controlling beams of the signals from the signal synthesizer/distributor, according to a demand of a mobile communication terminal, and outputting the beam controlled signals; a middle frequency generating block for receiving the signals from the channel controller and synthesizing the signals in each frequency to generate middle frequency signals; a transmitter for converting the middle frequency signals received from the middle frequency generating block into signals in a transmitting band; an RFB for amplifying the signals from the transmitter into signals in an output band and controlling phases of transmitting and receiving signals; and an antenna connection block for switching the signals to corresponding antennas of the RFB so that beams can be generated.

According to another embodiment of the invention, to obtain the foregoing objects, an apparatus for forming a beam in a base station is provided, comprising: a plurality of transmitters for transmitting signals, the signals being controlled in beam form according to the number of users in the base station; a coupling block for receiving the signals from the transmitters and transmitting the received signals to an antenna side; a switching controlling block for receiving the signals from the coupling block and switching the received signals according to the controlled results to output the switched signals; an amplifying block for amplifying the signals from the switching controlling block in a certain level and outputting the amplified signals; a plurality of matrix buffers for receiving the signals from the amplifying block and switching the received signals to antennas to control controlled beam shapes.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DETAILED DESCRIPTION OF THE PREFERRED EMBODIMENTS

Detailed descriptions of the embodiments of the invention are provided hereinbelow. However, it should be understood that these are provided only for helping the general understanding of the present invention and it will be apparent to those skilled in the art that the invention can be performed even without these specific matters. Also, in describing the invention, detailed description about related known functions or structures have been omitted where the description thereof unnecessarily obscures the substance of the invention.

Hereinafter, the present invention will be described in detail in reference to the appended drawings.

Figure 1:
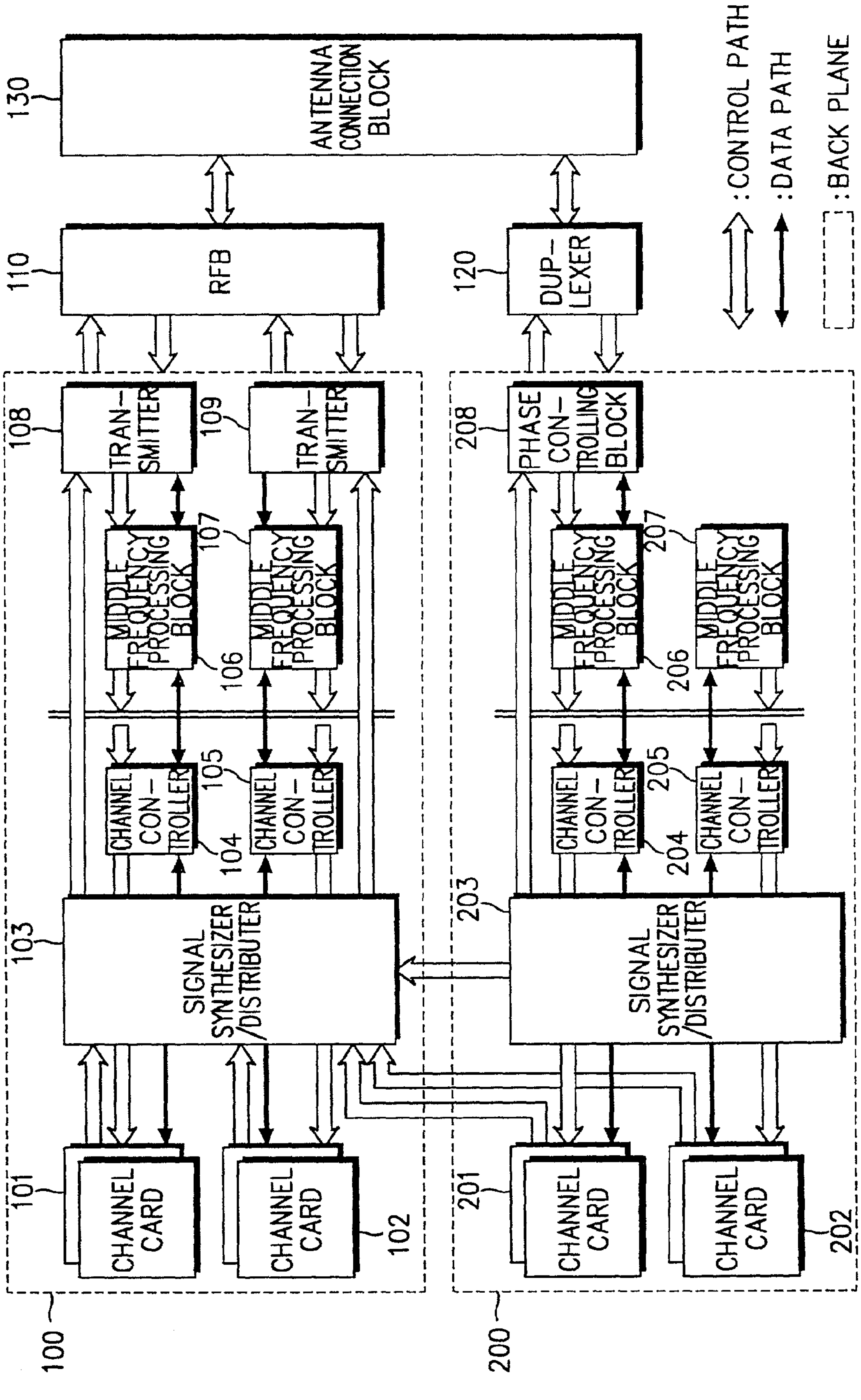
FIG. 1 is a block diagram of a base station system in which a smart antenna is applied according to a preferred embodiment of the invention.

FIG. 1 is a block diagram of a base station system in which a smart antenna is applied, according to a preferred embodiment of the invention. Hereinafter, the block construction and operations of the blocks will be described in detail in reference to FIG. 1.

The base station system is comprises of a first module 100, an RFT (Radio Frequency Block) 110, a duplexer 120, an antenna connection block 130 and a second module 200. The modules constructed of a back plane are different from each other. The first module 100 is comprised of two part channel cards 101 and 102. First module 100 also determines the shape of a (radio) beam, which will be formed in the base station within the channel cards, where each of the channel cards parts consists of six channel cards. In other words, the first module 100 controls a beam, which will be formed in the channel card to be mainly formed in the direction of a specific sector. A signal from each of the channel cards 101 and 102 is inputted into a signal synthesizer/distributor 103. The signal synthesizer/distributor 103 synthesizes a signal to be transmitted. Here, in synthesizing the signal, a phase of a signal received from the channel card is compared with that from the signal synthesizer/distributor 203 of the second module 200, to generate and output suitable phases to be transmitted.

The signals from the signal synthesizer/distributor 103 are inputted into channel controllers 104 and 105. Each of the channel controllers 104 and 105 controls the signals to be accorded to each channel, in which the signals were controlled and outputted, according to the specific sectors. In other words, each of the channel controllers 104 and 105 controls a frequency FA allocated to a corresponding sector and the foregoing sector according to the number of the users, and is constructed to accept a wide band. The signals from the channel controllers 104 and 105 are sent to middle frequency processing blocks 106 and 107. Each of the channel controllers 104 and 105 are connected to a receiver bus line, and connected to the middle frequency processing blocks 106 and 107 in a one-to-one corresponding manner. The signals from the channel controllers 104 and 105 are sent to middle frequency processing blocks 106 and 107. Here, the one-to-one related correspondence is correspondence according to the frequency of each channel, and each processing apparatus or processing device may not be one-to-one matched, according to the capacity thereof.

Each of the middle frequency processing blocks 106 and 107 outputs the inputted signals after processing into middle frequency, and the signals are sent to transmitters 108 and 109. In other words, the middle frequency processing blocks 106 and 107 and the transmitters 108 and 109 are also connected in one-to-one relation. The middle frequency processing blocks 106 and 107 will be described more in detail in reference to following FIG. 2. The transmitters 108 and 109 convert the middle frequency processed signals into transmit signals, then sends the converted transmit signals to RFB 110. The RFB converts the received transmit signals into transmit radio signals, and converts the converted transmit radio signals into transmission powers. The RFB 110 has an amplifier. The amplifier will be described more in detail in reference to following FIG. 3. The RFB 110 sends the converted transmit signals to an antenna connection block 130. Accordingly, transmit signals are outputted to an antenna set to each corresponding sector or FA. Such an antenna connection block 130 will be described more in detail in relation with coupling of the antenna and the transmitter in FIG. 4.

The antenna connection block 130 is connected in common with a duplexer 120. The duplexer 120 outputs the signal via the antenna connection block 130 to a phase controlling block 208 and also outputs signals from the phase controlling block 208 to the antenna connection block 130. The phase controlling block 208 receives the signals, via the duplexer 120, and transmit signals to inspect the degree of distortion of the phase. The inspected signals are inputted into middle frequency processing blocks 206 and 207, and inputted into signal synthesizer/distributor 203 through the same. The signal synthesizer/distributor 203 can output the distorted phase value from the generated signal value to the signal synthesizer/distributor 103 of the first module to compensate for the distorted phase. While the signal synthesizer/distributors 103 and 203 are discriminated in FIG. 1, for the sake of convenience, only one device may perform the same function.

The first module 100 and the second module 200 have the same construction. A difference between the first and second modules 100 and 200 is that the channel cards 201 and 202 in the second module 200 output signals to the signal synthesizer/distributor 103 in the first module 100, and receive signals from the signal synthesizer/distributor 203 in the second module 200. Also, when the signal synthesizer/distributors 103 and 203 are constructed within one device, the channel cards 201 and 202 are located at one side of the first module 100 or the second module 200, and process the signals directly within themselves without any operations of transmitting or receiving the signals as shown in FIG. 1.

Figure 2:
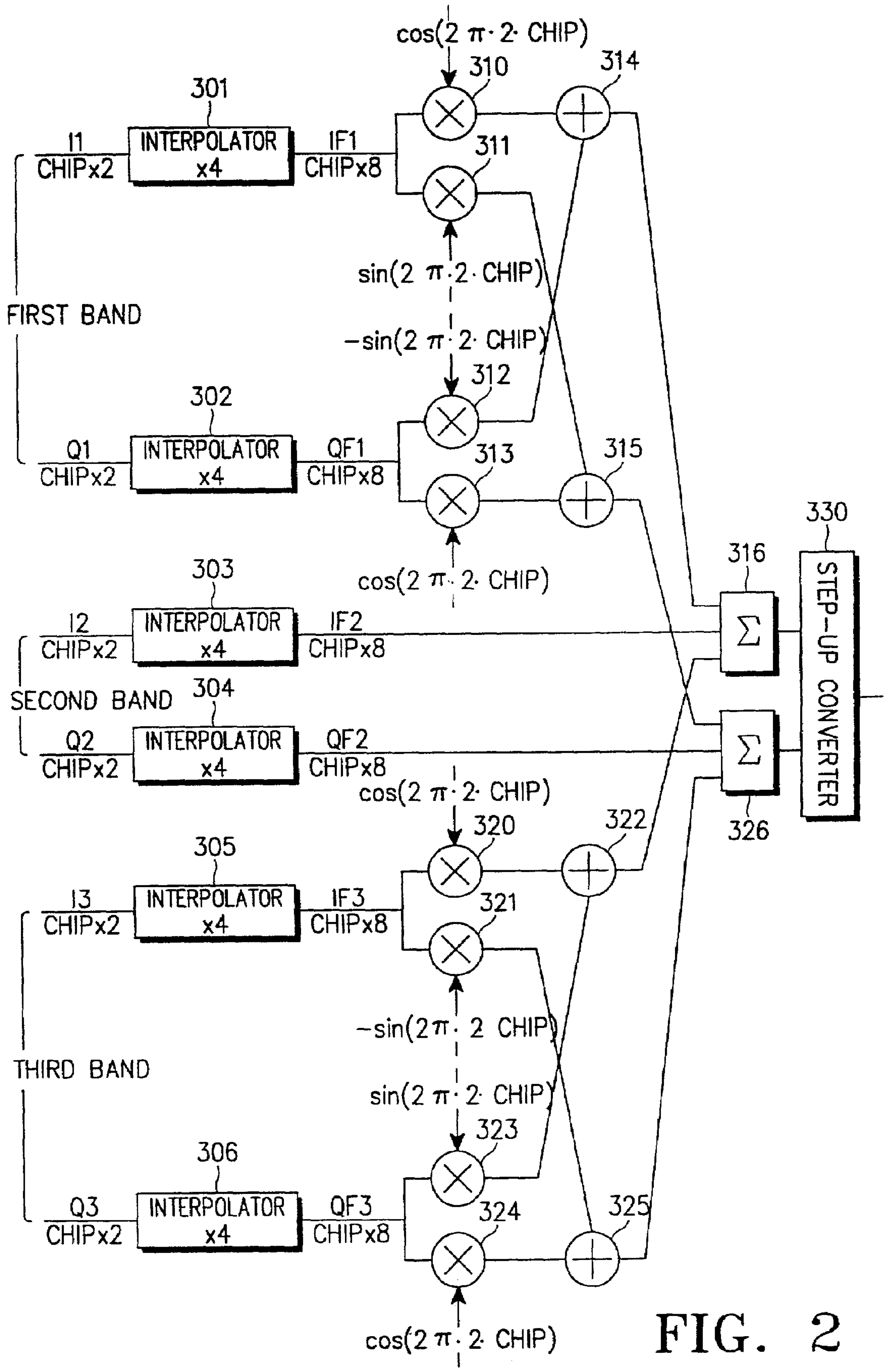
FIG. 2 is a detailed view illustrating the internal construction of the middle frequency processing blocks, according to the invention.

FIG. 2 is a detailed illustration of the internal construction of the middle frequency processing blocks, according to the invention.

Hereinafter, the internal construction and the operation of the middle frequency processing blocks according to the invention will be described in reference to FIG. 2. Also, there is a description of only channel controller 104 from the channel controllers 104, 105, 204 and 205 in the following description for simplicity.

The channel controller 104 receives a 3FA signal received from the middle frequency processing block 106. The 3FA signal is discriminated into first, second and third bands. In description of the signal in the first band of the discriminated signals, the first band signal is inputted as discriminated into an I channel signal I1 and a Q channel signal Q1. The signals are inputted into interpolators 301 and 302, processed in the interpolators 301 and 302, and then outputted as discriminated into IF1 channel chip signals and QF1 channel chip signals. The IF1 channel chip signals of the discriminated signals diverge into two signals. Each of the diverged signals is sent to each of multipliers 310 and 311. Here, one of the diverged IF1 channel signals is synthesized with a cosine signal in the multipliers 310, the other of the diverged signals is synthesized with a sine signal. The signal which is synthesized with the cosine signal is sent to an adder 314, and the signal which is synthesized with the sine signal, is sent to an adder 315.

Meanwhile, the QF1 channel signals in the first band are also processed in the interpolator 302 then diverge. One of the diverged signals is multiplied with a sine signal having a negative value in a multiplier 312, and the other of the diverged signals is multiplied with a cosine signal in a multiplier 313. The signal multiplied in the multiplier 313 is added in the adder 315. The signals from multiplier 310 and multiplier 312 are added in the adder 314, then sent to an adder 316. The signals from multiplier 311 and multiplier 313 are added in adder 315, and then sent to adder 326. Then, signals in the second band are also discriminated into I2 channel signals and Q2 channel signals, processed, then outputted in corresponding interpolators 303 and 304.

Also, signals in the third band are also discriminated into I3 channel signals and Q3 channel signals, processed in corresponding interpolators 305 and 306, and then diverge into 2 signals respectively to be outputted. One of the signals from the I3 signal is diverged into the IF3 channel that is inputted into an multiplier 320 to be synthesized with a cosine signal, and the other one of the signals, from the I3 signal, is synthesized with a sine signal having a negative value to be multiplied in multiplier 321. The signal multiplied in the multiplier 320 becomes one input of an adder 322. The other one of the signals multiplied in multiplier 321 becomes one input of an adder 325. Also, signals of a Q3 channel of the third band are processed in the interpolator 306, and outputted into two diverged signals of QF3. One of the diverged output signals from QF3 is multiplied with a sine value in a multiplier 323, and is output to be added in the adder 322, and then outputted to adder 316. The other one of the diverged QF3 signals is multiplied in the multiplier 324 with a cosine value, then inputted into the adder 325. The output of adder 325 is inputted to adder 326.

The signals from the adder 314, the interpolated signals of the I2 channel of the second band and the signals from the adder 322 are added in the adder 316. Also, the signals from the adder 315, the interpolated-signals of the Q2 channel of the second band and the signals from the adder 325 are added in an adder 326. In other words, signals added in each band are finally added and then outputted in the invention. In this manner, the shape of a beam can be managed more effectively. The signals added in the foregoing adders 316 and 326 respectively are inputted into a step-up converter 330, and then ascended into a certain frequency band.

Figure 3:
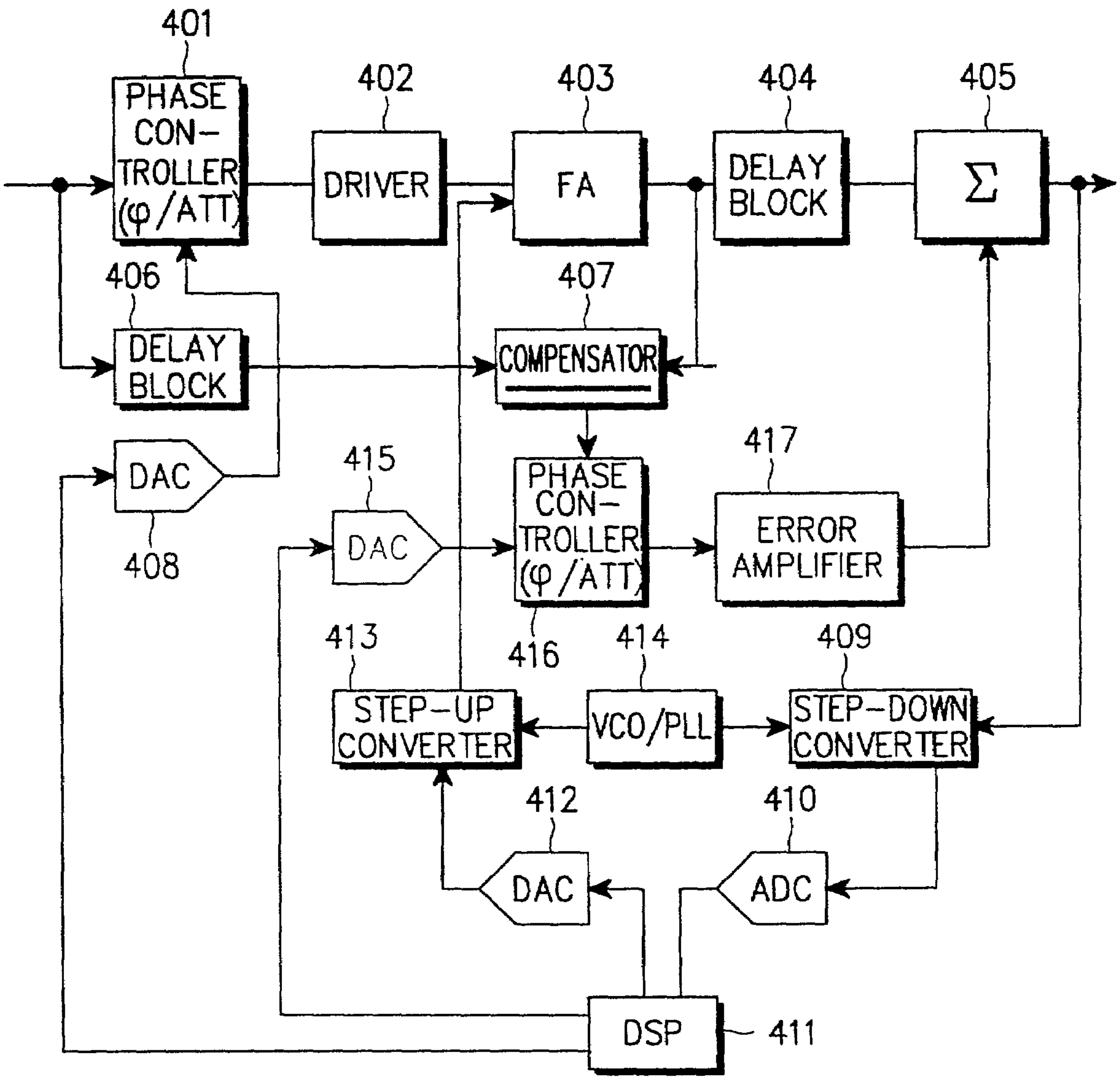
FIG. 3 is a detailed block diagram illustrating the internal construction of the RFB, according to a preferred embodiment of the invention.

FIG. 3 is a detailed illustration of the internal construction of the RFB 110, according to a preferred embodiment of the invention. Hereinafter, the construction and the operation of the RFB 110, according to the invention, will be described in detail in reference to FIG. 3.

The signals received from the transmitters are inputted into a phase controller 401 and a delay block 406 consisting of delay lines. The phase controller 401 adjusts the dimension of the signals, so that phases of the inputted signals match a certain level. The adjusted signals are inputted into a driver 402. The driver 402 actuates the level adjusted signals to be inputted into a frequency assignment block 403. The frequency assignment block 403 compares and phase processes the frequency controlled signals with the inputted transmission signals to be inputted into a delay block 404. An output from the delay block 404 is inputted into an adder 405, where the output of the delay block 404 is added together with a value controlled in the following DSP (Digital Signal Processor) 411, then outputted. Prior to being added in adder 405, the outputs from the DSP 411 are sent to DACs 408, 412 and 415 for converting digital signals into analog signals. The DACs converts the received digital signals into analog signals and outputs the analog signals. The signals converted in the DAC 415 are inputted to a phase controller 416. The phase controller 416 receives signals from the compensator 407 and inputs the signals into the error amplifier 417. The error amplifier 417 amplifies error values of the received signals from the phase controller 416 and sends the amplified error values to the adder 405. Then, the adder 405 adds the compensated error values.

Meanwhile, signals from delay block 406 are inputted into a compensator 407. The compensator 407 compensates distorted signals of the inputted signals by generating a reverse phase of the distorted signals. Such signals are generated by using the signals from the frequency assignment block 403 and the signals delayed in the delay block 406.

Also, the output signals of the adder 405 are inputted into a step-down converter 409 simultaneously with the output. The step-down converter 409 descends the signals to a certain level. For this purpose, a voltage-controlled oscillator 414 generates and outputs signals of a certain frequency. Such lower level signals are converted into digital signals in an ADC (analog-to-digital converter) 410 to be inputted into DSP 411. The DSP 411 receives the signals of digitalized frequencies to perform a control of compensation about the same. In other words, if the frequency is rapid, a signal is generated to slow the frequency. If the frequency is slow, a signal is generated and outputted to accelerate the frequency.

The signals inputted into the DSP 411 are sent to a step-up converter 413 through DAC (digital-to-analog converter) 412 as pilot signals. The final output signals, according to such controls, are added with signals from a main amplifier in the adder 405 as described below, and the added signals are outputted. The distorted signals are compensated through such a process. Also, due to the application of the DSP 411, estimation can be made easily about control features of degradation due to the external environment, and an amplifier is delivered with a previously set factor value during manufacturing so that the power consuming amount of the DSP can be remarkably reduced.

The signals from the DSP 411 are sent to DACs 408, 412 and 415 for converting digital signals into analog signals. The DACs output analog signals converted from the received digital signals. The signals converted in the DAC 408 are sent to the phase controller 401, the signals converted in the DAC 415 are inputted to another phase controller 416, and the signals converted in the DAC 412 are inputted into the step-up converter 413. First of all, the signals inputted into the step-up converter 413 are converted with a stepping-up frequency, then inputted into the frequency assignment block 403 so that a frequency control is performed. The phase controller 416 also receives signals from the compensator 407, and the signals from phase controller 416 are inputted to an EA (Error Amplifier) 417. The EA 417 amplifies error values of the received signals with a certain degree of amplification, and the amplified error values are sent to the adder 405. As the error values are compensated like above, the adder 405 adds the compensated error values to perform a compensation of phase.

Figure 4:
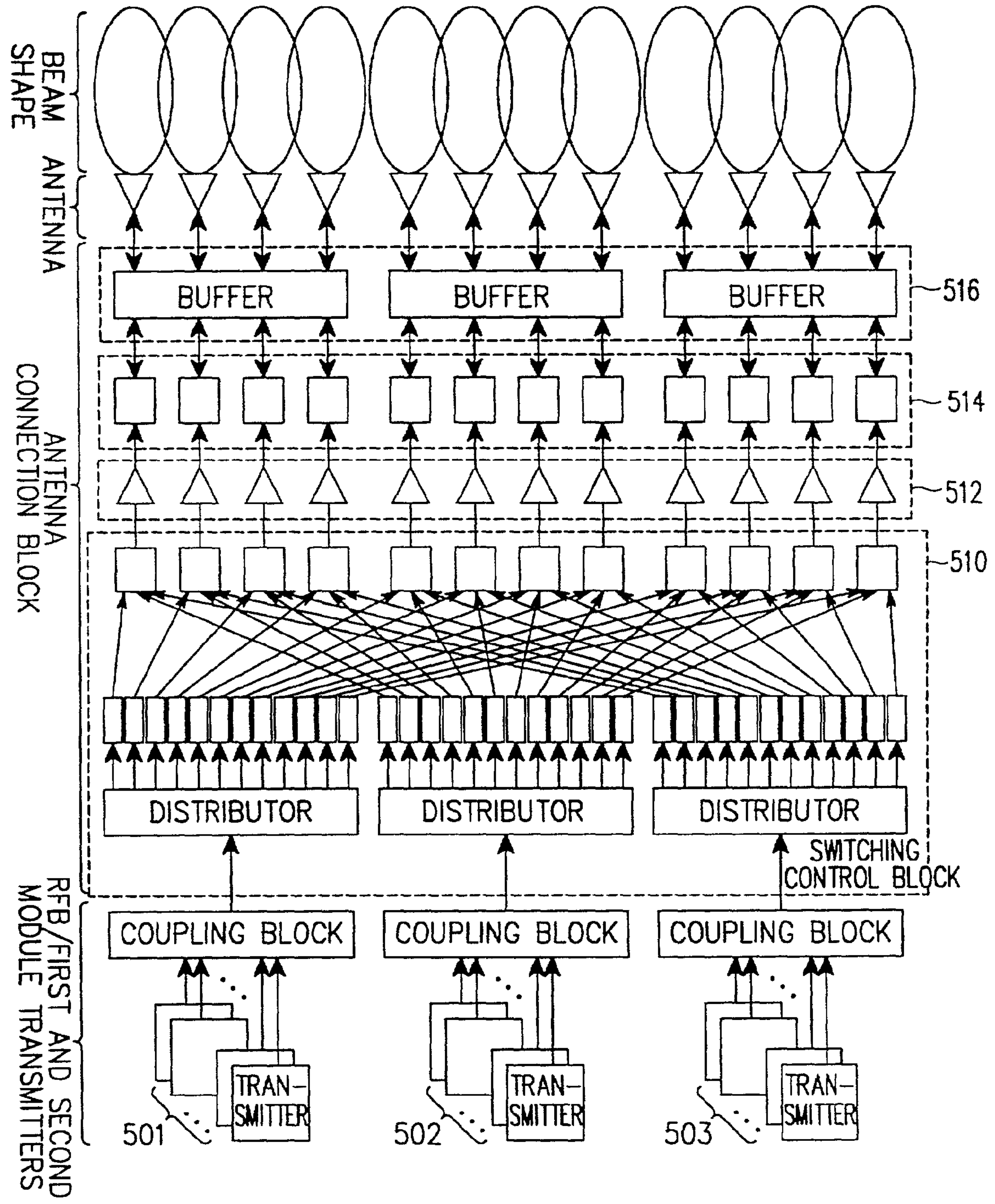
FIG. 4 is a detailed view illustrating the construction of the antenna connection block and associated parts, according to a preferred embodiment of the invention.

FIG. 4 is a detailed illustration showing the construction of the antenna connection block and associated parts, according to a preferred embodiment of the invention. Hereinafter, the construction and the operation of the antenna connection block and the associated parts according to the invention will be described in detail in reference to FIG. 4.

Transmitters of the RFB, the first module 100 and the second module 200 are adapted to cause signals from transmitters 501, 502 and 503 to be coupled with a switching control block 510 via coupling blocks. The switching control block 510 receives inputs via distributors to control a beam shape according to the distribution and requirement of users in the base station. The distributors distribute signals received from each of the coupling blocks in twelve directions. Here, the signals are distributed to each of the sectors to which each of the antennas belongs, according to values considering the number of the users. The signals from each of the foregoing distributors are connected to switches which have one destination respectively, and are connected to next switching terminals of the corresponding destination. The signals distributed by the distributors are switched as shown in FIG. 4. For example, if the distributor is supposed to transmit 6 signals to A sector, 3 signals to B sector, and 3 signals to C sector, the switching control block 510 controls the distributors to transmit 6 signals to a switch for transmitting the signals to A sector, and distributes 3 signals for transmitting and distributes 3 signals for transmitting to the C sector. There are 6 signals transmitted to the switches for A sector and while the other signals are sent to B sector and C sector, respectively. The switched signals are inputted into a power amplifier block 512, amplified in the power amplifiers into a transmitting output, then sent to an antenna front end unit 514, which is connected to an array of antennas. The antenna front-end unit 514 outputs the received signals to buffers 516, which outputs the same to the antennas. The buffers 516 have a 4×4 matrix structure and performs a switching technique. The switching technique is used to accommodate a greater number of the users considering antenna features, etc. The beam shapes of the antennas can be finally adjusted more accurately by using the matrix buffer 516.

Figure 5:
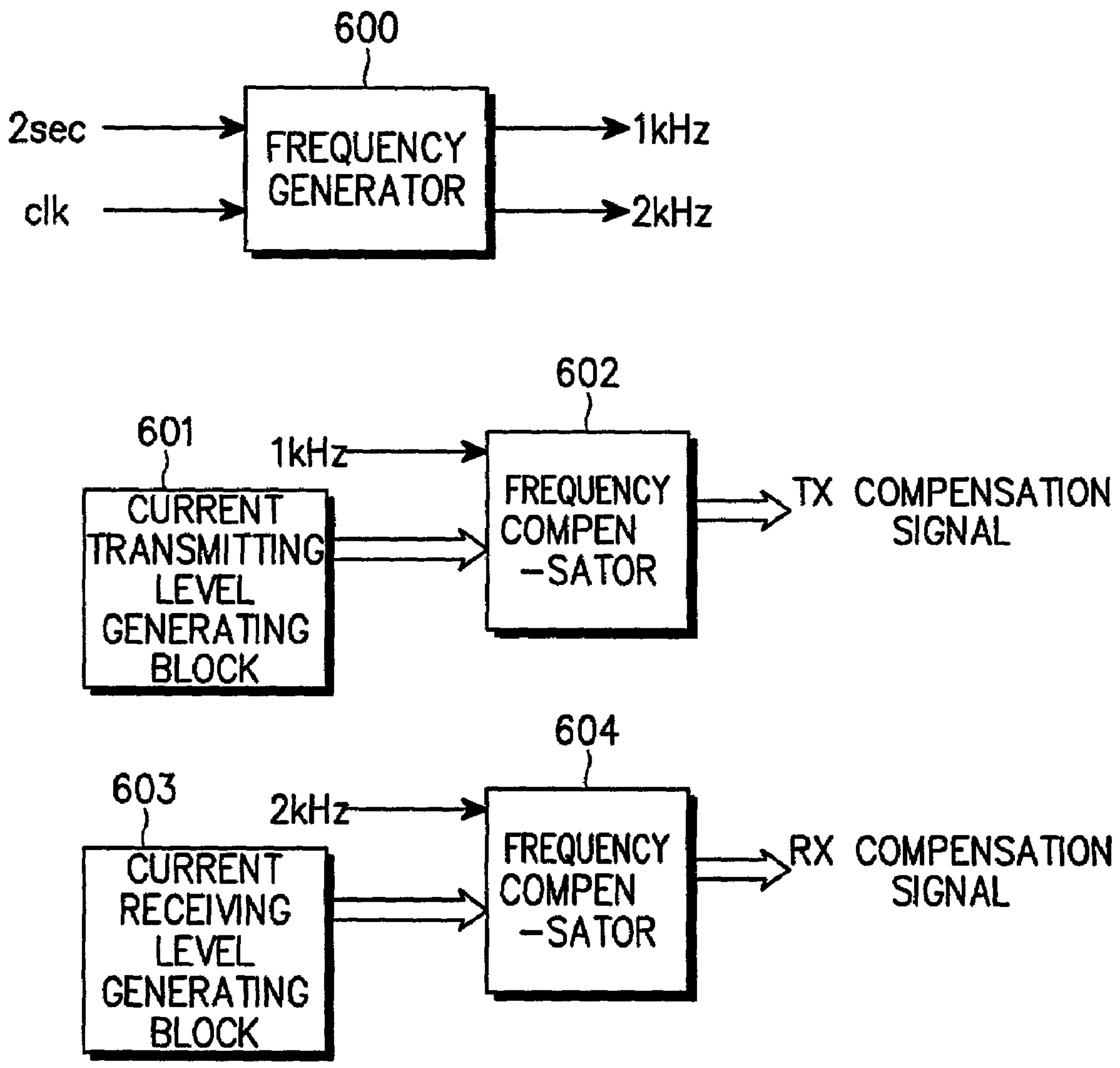
FIG. 5 illustrates the structure of a frequency generating block for phase compensation of an array antenna, according to a preferred embodiment of the invention.

FIG. 5 shows the structure of a frequency generating block for phase compensation of an array antenna according to a preferred embodiment of the invention. Hereinafter, the construction of a frequency controlling block will be described in detail in reference to FIG. 5.

The frequency generator 600 receives clock signals used in the base station, in which the clock signals are received every two seconds. The frequency generator 600 generates signals of 1 KHz and 2 KHz. The signals of 1 KHz from the frequency generator 600 are inputted into a transmitting frequency compensator 602, and the signals of 2 Khz from the generator 600 are inputted into a receiving frequency compensator 604. The transmitting frequency compensator 602 receives signals from a current transmitting level generating block 601 in order to generate current transmitting level signals, compares the signals, then outputs TX compensation signals which require the modification of transmission level. Also, the receiving frequency compensator 604 receives outputs from a current receiving level generating block 603, compares the signals, and then outputs RX compensation signals which require the compensation from received signals according to the compared values.

While a detailed embodiment has been described, it should be understood that various modifications and variations can be made without departing from the scope of the invention. Thus, the scope of the invention should not be limited by the above-described embodiments, but is defined by the following claims and equivalents thereof.

What is claimed is:

1. An apparatus for forming a beam in a base station, comprising:

a plurality of channel cards for processing and outputting signals to be transmitted to each channel;

a signal synthesizer/distributor for synthesizing the signals from the channel cards and compensating phases of the signals;

at least one channel controller for controlling beams of the signals from the signal synthesizer/distributor according to a demand of a mobile communication terminal, and outputting the controlled beam signals;

at least one middle frequency generating block for receiving the signals from the at least one channel controller and synthesizing the signals in each frequency to generate middle frequency signals;

at least one transmitter for converting the middle frequency signals received from the at least one middle frequency generating block into signals in a transmitting band;

a Radio Frequency Block (RFB) for amplifying the signals from the at least one transmitter into signals in an output band and controlling phases of transmitting and receiving signals; and an antenna connection block for switching the amplified signals to corresponding antennas of the RFB so that beams can be generated.

2. An apparatus for forming a beam in a base station, comprising:

a plurality of transmitters for transmitting signals, the signals being controlled in beam form according to the number of users in the base station;

a coupling block for receiving the signals from the transmitters and transmitting the received signals to an antenna side;

a switching controlling block for receiving the signals from the coupling block and switching the received signals according to the controlled results to output the switched signals;

an amplifying block for amplifying the signals from said switching controlling block in a certain level and outputting the amplified signals; and a plurality of matrix buffers for receiving the signals from the amplifying block and switching the received signals to antennas to control beam shapes.

* * * * *